March 5, 1940.    H. MITCHELL    2,192,322

LOCK WASHER SCREW AND METHOD OF MAKING THE SAME

Filed March 11, 1939

Harvey Mitchell
INVENTOR.

BY Clarence E. Threedy
HIS ATTORNEY.

Patented Mar. 5, 1940

2,192,322

UNITED STATES PATENT OFFICE 2,192,322

LOCK WASHER SCREW AND METHOD OF MAKING THE SAME

Harvey Mitchell, Rockford, Ill., assignor to National Lock Co., Rockford, Ill., a corporation of Delaware Application March 11, 1939, Serial No. 261,165

8 Claims. (Cl. 10—10)

This invention relates to improvements in screws equipped with lock washers and has as its principal object the provision of an improved screw of this class in which the lock washer is retained in a groove adjacent the screw head by a shoulder of particular form.

Another object is the provision of a method of making lock washer screws wherein the screw shank is provided with a shoulder and the shoulder is grooved adjacent the head and the edge portion of the shoulder toward the shank beveled or chamfered, the shank thereafter being threaded, and a lock washer passed over the chamfered shoulder and forced into the groove where it remains due to its own resiliency or springiness.

Another object is the provision of a method of making lock washer screws in which the threading may be done before or after the application of the lock washer.

Another object is the provision of a lock washer screw and method of making the same wherein the lock washer is held in position by a shoulder over which the washer has been forced in assembly, and the shoulder is swaged or flared by the same operation which forces the washer into place, the threading being done either before or after the application of the washer.

Yet another object is the provision of a method of making an assembled lock washer and screw bolt such as characterized hereinabove and which is applicable to any style or type of screw and in which the important operations of slotting and threading may be carried out on standard screw making equipment.

Other objects, advantages and economies residing in the invention will appear as the following description proceeds in view of the annexed drawing, in which:

Fig. 8 is a cross section along line 8—8 of Fig. 6; while

The term lock washer screw as employed herein means, in its broadest aspect, a screw or bolt or analogous device having a lock washer or analogous member associated in assembly therewith, or, in other terms, a screw having the lock washer permanently in place thereon ready for use.

Figure 1:
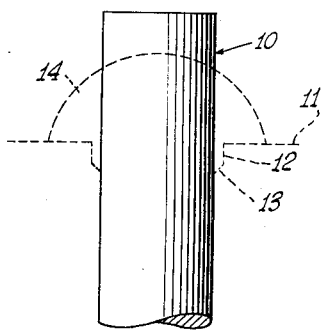
Fig. 1 is a diagrammatic view of the first step of the method.

The method for making the improved lock washer screw begins with the step illustrated in Fig. 1, wherein the usual rod stock 10 is fed into the die 11 of a heading or upsetting machine of the usual type except that the die is made to form the particular chamfered shoulder hereinafter described, the bore of the die including a short cylindrical section 12 and a truncated conical section 13. The stock is forced into the die in the usual manner to upset or form the head 14, which in this instance is round, it being understood that any shape of head may be formed in this manner, including the round and flat head types of Figs. 6 and 7.

Figure 2:
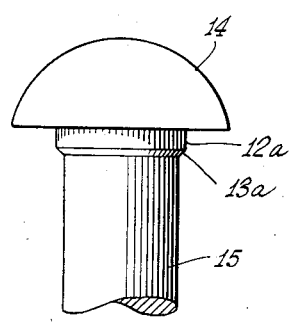
Fig. 2 is a side view of the headed or upset shank resulting from the operation of Fig. 1.

As a result of the foregoing upsetting operation, the blank of Fig. 2 is produced wherein the shank 15 has a shoulder 12a formed adjoining the head 14 with the lower or outer edge 13a of the shoulder chamfered or beveled.

The blank of Fig. 2 is next subjected to a slotting and grooving operation which may be performed in standard machines designed for this purpose and which simultaneously cut the cross slot 16 into the head and also turn a groove 17 into the shoulder adjoining the head. In this sense, the groove 17 is disposed between the remnant 12b of the shoulder and the head 14, and the turning operation results in forming a neck between the shoulder and head which is of lesser diameter than the shank.

Figure 3:
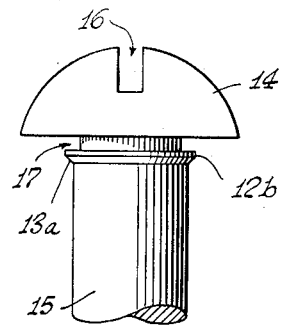
Fig. 3 is a side view of the blank of Fig. 2 after same has been slotted and grooved in the second step of the method.
Figure 4:
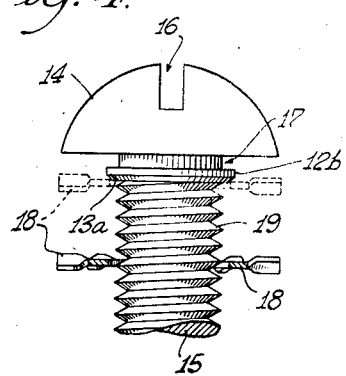
Fig. 4 is a side view of the blank of Fig. 3 after a cut threading has been applied and illustrating the application of the lock washer.
Figure 5:
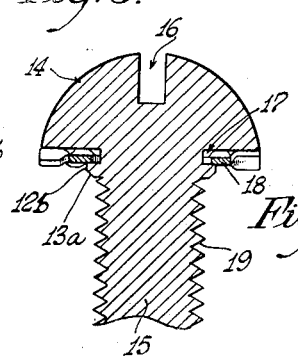
Fig. 5 is a longitudinal section through the screw of Fig. 4 after the lock washer has been forced into place and corresponding to the last step of the method.

The finished blank appears as in Fig. 3, and in the next step of the method is ready for threading either by a rolling or cutting process, the screw of Fig. 4 having a cut thread 19 and, in the final steps of the method, having a lock washer 18 passed over the threaded shank, the washer preferably being of the closed or ring type and the diameter of the hole therein being such that the washer is stopped on the chamfered portion of the shoulder in the dotted line position indicated in Fig. 4, and thereafter the shank portion of the screw is fitted into a suitable bore or sleeve member of an inside diameter closely approximating the diameter of the shoulder, and the screw is then moved into the bore or the sleeve member moved against the shoulder of the screw so as to engage the washer and force the same beyond the chamfered edge and over the shoulder until it springs into the groove 17 as illustrated in Fig. 5. It is contemplated that the diameter of the bore or sleeve means which is employed to spring the washer into the groove may be such that the chamfered part of the shoulder is slightly swaged or flared to enlarge the same and obviate any possibility of the lock washer being worked out of the groove, it being understood that this swaging or flaring is optional, since the clearance between the inner diameter of the washer and the shoulder formation may always be calculated so that the inherent tendency of the material of the washer to assume its original shape will spring it into the groove adequately to assure its remaining there for most practical purposes. Where the screw is to be subjected to unusual handling or abuse prior to use, the swinging may be included.

Figure 6:
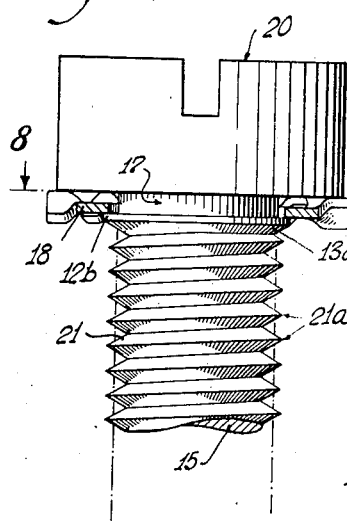
Fig. 6 is an enlarged side view of a fillister type screw with the washer in place and utilizing a rolled thread.
Figure 8:
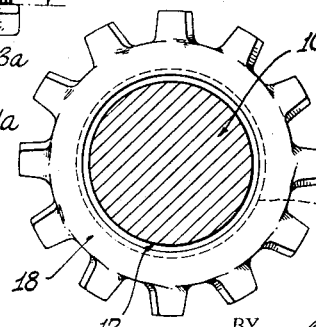
Figure 7:
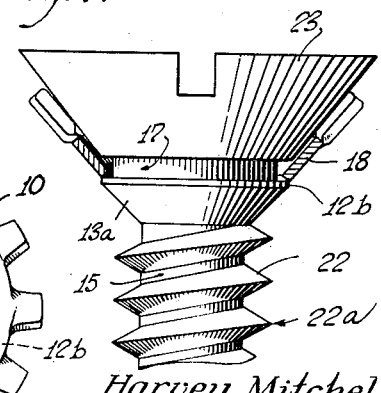
Fig. 7 is an enlarged side view of a flat head screw with the washer in place and a cut thread.

The screws of Figs. 6 and 7 are formed in the same manner as that heretofore described, with the exception that in Fig. 6 the head 20 is of the cylindrical or fillister type, and the threading 21 has been rolled onto the shank. In the screw of Fig. 7, the threading 22 has been cut and the head 23 is of the flat type for countersinking. In other respects, the washers 18 on the screws of Figs. 6 and 7 are applied in the same manner.

It is of importance to point out that the novel lock washer screw can be made as readily when the threading is rolled as when it is cut, the difference residing in the fact that with a rolled threading the outermost edge or peak 21a of the threading is extruded or squeezed beyond the diameter of the shank whereas the outer edge portion 22a of the cut thread lies flush with the diameter of the stock or shank. In either case, the diameter of the hole of the lock washer is such that it will fit freely over the threading and against the chamfered portion 13a of any of the screws, the mean diameter of the beveling or chamfering approximating the initial diameter of the hole in the lock washer ring, so that the peripheral edge of the hole in the washer will bear against the beveled surface of the shoulder more or less close to the juncture of the beveling with the rest of the shoulder without passing over the shoulder into the groove, the washer being forced into position in the manner heretofore described.

Figure 9:
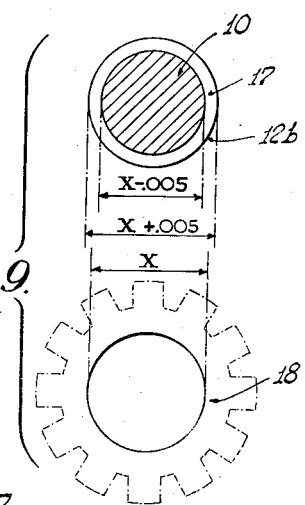
Fig. 9 is an operative diagram illustrating the clearance between the shoulder and groove.

In Fig. 9, the clearances, which may preferably be employed in carrying out the aforesaid method, are depicted wherein X is taken as the mean diameter of the washer hole to receive the shank or stock 10, and $$X - .005$$

is the diameter across the bottom of the groove 17, while $$X + .005$$

is the diameter across the finished shoulder portion 12b. By reference to Figs. 4, 6 and 7, it will be observed that the outermost edges or peaks of the threading do not extend beyond the widest portion 12b of the shoulder so that the diameter of the hole and the washer may always be calculated to permit the same to pass freely over the threading without riding the same and to fit more or less intimately against the chamfered or beveled portion of the shoulder. Due to the normal clearance provided between the lock washer and the threading, it will be apparent that among its other advantages the invention permits the use of standard sizes of lock washer with standard screw sizes. In any event, the threading may be applied before or after the lock washer is in position.

The beveling operation may be omitted, and the corresponding feature on the screw dispensed with, if desired. The best results are obtained by employing the bevel or chamfer on the shoulder.

The objects and advantages of the invention may be accomplished by variations in the steps of the method and in the structure resulting therefrom without departing from the spirit or scope of the invention, and the same is therefore not restricted to any of the details set forth herein except as may be provided in the appended claims.

Having thus described my invention, what I claim as new and desire to protect by Letters Patent is:

1. The method of making an assembled screw and lock washer which includes providing a shank with a head and adjoining shoulder, chamfering said shoulder along the margin thereof remote from said head, grooving said shoulder adjacent the head, threading said shank, passing a lock washer over the threaded portion of the shank against the chamfered portion of said shoulder, and forcing said washer over the shoulder and into the groove and swaging the shoulder to flare it outwardly to securely retain the washer in the groove.

2. The method of making a screw and lock washer assembly which comprises deforming a piece of elongated stock to form a head thereon and a shoulder adjacent said head with a beveled edge on said shoulder remote from the head toward the remaining extension of the stock, said last-mentioned extension constituting the shank of the screw, simultaneously slotting said head and grooving said shoulder at the juncture of the latter with said head, passing a lock washer over said shank against said shoulder and springing said washer into said groove by forcing the same over said shoulder, and threading said shank.

3. The method of making an assembled screw and lock washer which comprises deforming rod-like stock to form a head with an adjoining shoulder and a beveled edge on the shoulder at the juncture of the shoulder with the remaining extension of the stock, said remaining extension constituting a shank, simultaneously cross slotting said head and grooving said shoulder at its juncture with the head, threading said shank and passing a lock washer of closed annular shape freely over said threading against said shoulder and springing said washer into said groove by forcing the same over the shoulder and against the head.

4. The method of making an assembled screw and lock washer which includes upsetting rod-like stock to form a head with an annular shoulder adjoining the same and a shank extending from the shoulder, said upsetting operation also beveling the portions of said shoulder at the juncture thereof with said shank, cross slotting said head, grooving said shoulder in the region of its juncture with said head to form a washer seat, threading said shank, passing a closed lock washer ring over the threaded shank and against said shoulder and simultaneously springing said washer into said seating groove, and deforming the shoulder to flare or widen the same.

5. The method of making an assembled screw and lock washer which includes upsetting rod-like stock to form a head with an annular shoulder adjoining the same and a shank extending from the shoulder, said upsetting operation also beveling the portions of said shoulder at the juncture thereof with said shank, cross slotting said head, grooving said shoulder in the region of its juncture with said head to form a washer seat, passing a lock washer in the form of a closed ring over said shank against said shoulder and simultaneously springing said washer over the shoulder into said seat and deforming the shoulder to flare the same, and threading said shank.

6. The method of making a lock washer screw which comprises forming a head and adjoining shoulder on a shank simultaneously with beveling said shoulder in the region of its juncture with the shank, cross slotting said head and grooving said shoulder in the region of its juncture with the head, rolling a thread onto said shank, fittting a lock washer in the shape of a closed ring freely over the threading on the shank and against said shoulder and springing said washer into said groove by forcing the same over the shoulder.

7. The method of making a lock washer screw which comprises forming a head and adjoining shoulder on a shank simultaneously with beveling said shoulder in the region of its juncture with the shank, cross slotting said head and grooving said shoulder in the region of its juncture with the head, cutting a thread onto said shank, fitting a lock washer in the shape of a closed ring freely over the threading on the shank and against said shoulder and springing said washer into said groove by forcing the same over the shoulder.

8. The method of making a lock washer screw which comprises simultaneously forming a head and adjoining shoulder with a circumferential bevel remote from said head on a shank by upsetting stock in a die and thereafter grooving said shoulder to provide a washer seat, and passing a washer loosely by axial displacement over said shank and simultaneously forcing the washer over said shoulder into the groove and flaring the shoulder to enlarge the same to prevent possible withdrawal of the washer from the groove.

HARVEY MITCHELL.